UNITED STATES PATENT OFFICE.

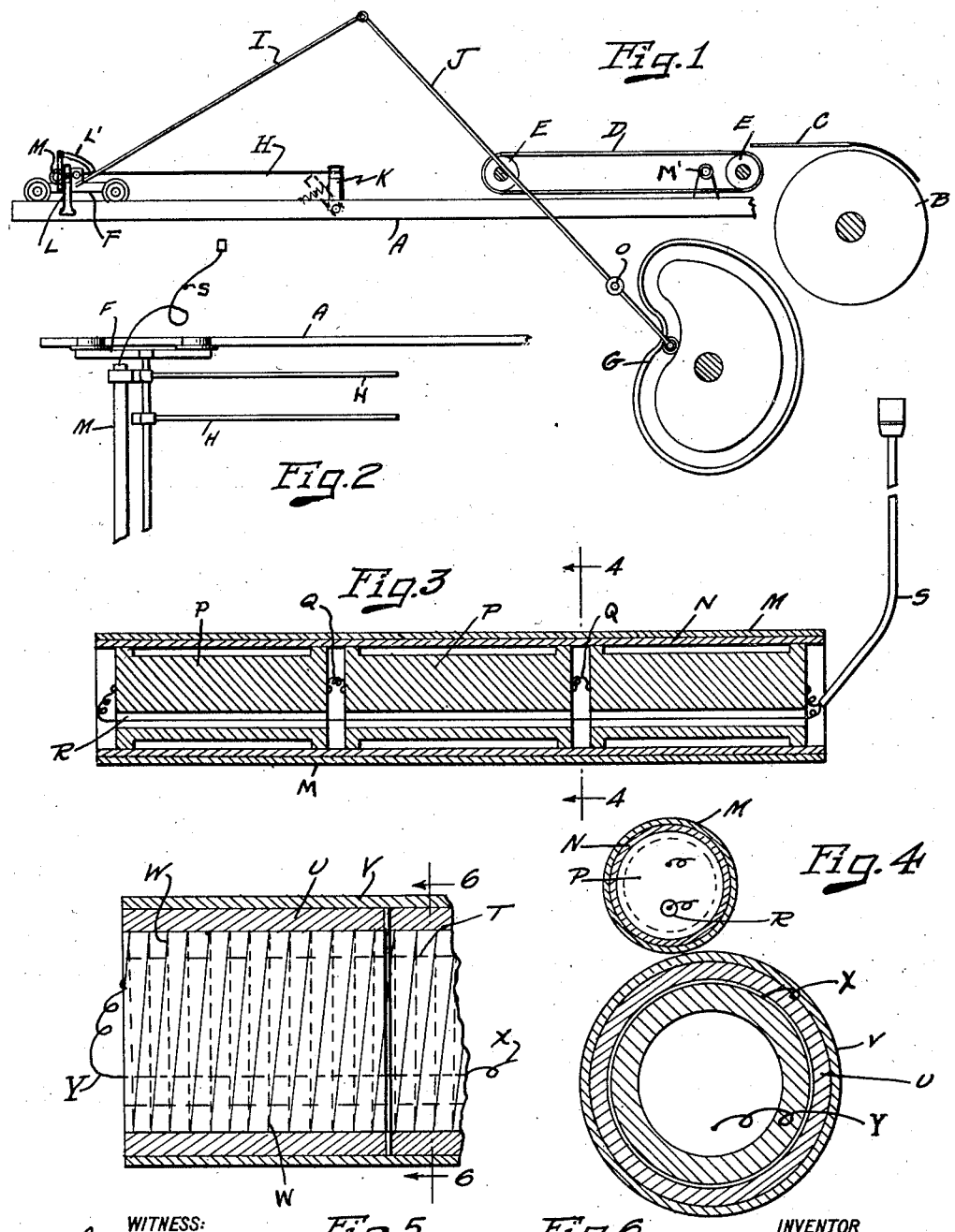

WILLIAM J. DANINGBURG, OF WINDSOR, ONTARIO, CANADA.

ELECTRIC SHEET-DRIER.

1,393,759.  Specification of Letters Patent.  Patented Oct. 18, 1921.

Application filed April 30, 1920. Serial No. 377,913.

*To all whom it may concern:*

Be it known that I, WILLIAM J. DANINGBURG, a citizen of the United States, residing at Windsor, Province of Ontario, Dominion of Canada, have invented a certain new and useful Improvement in Electric Sheet-Driers, and declare the following to be a full, clear, and exact description of the same, such as will enable others skilled in the art to which it pertains to make and use the same, reference being had to the accompanying drawings, which form a part of this specification.

This invention relates to apparatus for quickly drying printed sheets, particularly those in which more than one color is involved in the design, as they come from the printing rolls, and has for its object an improved arrangement of parts by which the sheet may be subjected to an efficient heating influence, while being handled by parts now quite generally employed in this branch of the arts, and yet permitting avoidance of injury to those parts themselves because of the heat.

In the drawings:

Figure 1 is a side elevational view of the printing cylinder members with an endless belt or tape carrier and a reciprocating carriage whereon is mounted a grating or frame of what are called fly sticks.

Fig. 2 is a fragmentary plan view of this apparatus showing my device in position relatively to the carriage.

Fig. 3 is an enlarged sectional elevation of one form of my improved drying apparatus.

Fig. 4 is a cross section taken along the line 4—4 of Fig. 3.

Fig. 5 is a sectional view of a slightly modified form of drying member.

Fig. 6 is a cross section along the line 6—6 of Fig. 5.

A represents the frame of a printing press, at one end of which is rotatably mounted the printing cylinder B, from which the printed sheets C pass to the endless tapes D, which are spacedly mounted on the rollers E. To the left of the delivery end of the endless tape carrier, as shown in Fig. 1, the frame A is formed as a track-way, along which the carriage F is adapted to reciprocate, being actuated by the links I and J, the latter pivoted at O to the frame of the machine, and with its roller-tipped lower end engaging in the track of the actuating cam G. Mounted on the carrier F are a series of fly sticks H, which, when the carriage is moved to its nearest point of approach to the roller tapes D, are adapted to receive the printed sheets C and carry them one by one to the delivery end of the printing machine. As the sheet resting upon the fly sticks H is drawn to the delivery end of the frame A, it passes slidably over the weighted or spring-held pivoted stop K, which is thereby swung to the dotted line position shown in Fig. 1; but as the carriage reaches the limit of its travel in this direction, the sheet, resting as it does on the fly sticks H, is moved so far toward the delivery end of the device (the left-hand end as shown in Fig. 1) that its rearward edge passes beyond the spring-held stop K, which, being no longer pressed downwardly (to the dotted line position shown), at once resumes its upright or full-line position; at almost the same instant, the sheet encounters the stop L which actuates the finger or detent pieces L' into seizing engagement with the adjacent or forward edge of the sheet, so that when the carriage F and its supported frame of fly sticks starts to travel away from the stop L and back toward the right-hand end of the apparatus (as seen in Fig. 1), the paper sheet is frictionally held against movement with the fly stick supports further than the stop K, which, in its now upright position, engages the rearward edge of the sheet (that nearest the rollers E and endless tapes D). The forward or left-hand edge of the sheet has by this time passed over, and continues to slidably pass over the smooth surface of the metal tube M, which, in the form shown in Fig. 3, is asbestos lined as at N, and incloses a series of heat-resisting elements P, connected with one another by fuses Q, and with a suitably insulated return wire R passing through the center of the tube to connection with the current cord S, one wire of which is of course connected to the adjacent end of the nearest heat resisting element P. This drying member, while thus efficiently serving to heat the sheet and thus dry the ink as the sheet slowly passes over its smooth surface, is at all times sufficiently remote from the tape D, so that its heat exerts no rotting influence upon the tapes, as is the case when some form of heating member is permanently located near the tapes for influence upon the sheets as they are carried by them.

In the form shown in Figs. 5 and 6, this drying element takes the form of a cement cylinder T inclosed within a metal cylinder V, the cement cylinder being wound with a series of coils W, suitably connected with a source of electricity by the wire X and the insulated return wire Y. These coils are spaced from the adjacent interior face of the cylinder V by asbestos or isinglass fillers U.

This heating of the sheets not only accelerates the drying of the ink, thus enabling a larger number to be handled in a given time, but as well avoids any tendency to the presence, within their mass when piled, of static electricity, which is a factor already known as necessary to contend with in connection with the printing of cold sheets.

It sometimes proves desirable to locate one of these drying elements in the vicinity of the printing cylinder B and the endless tapes, as well as in position on the reciprocating carriage as described, and I have indicated this at M' in Fig. 1. In such case the points on its periphery in line with the several endless tapes D should be protected by strips or bands of asbestos or similar protective material.

What I claim is:

1. In a printing mechanism, in combination with an endless belt mechanism, adapted to effect the travel of the paper sheets away from the immediate vicinity of the printing element, a reciprocatory carrier adapted to receive the printed sheet from said endless belt mechanism, and a drying member located on the other side of said reciprocatory carrier from said endless belt mechanism, over which the printed sheets are adapted to slide when they have been carried by said reciprocatory carrier to the limit of its travel away from said endless belt mechanism.

2. In combination with a reciprocatory carrier for receiving printed sheets, a transversely disposed tubular shell inclosing electrically actuated heating elements, over which said sheets are caused to travel after resting on said carrier during a portion of each cycle of operations, said drying member being located on the opposite end of said carrier from that first encountered by the printed sheets as they are fed theretoward.

3. An ink-drying element for a printing mechanism, comprising an inclosing casing over whose outer surface the sheets are adapted to pass, a series of connected resistance units within said casing, and suitably insulated wires connected therewith.

4. In combination with means for causing the travel of printed sheets thereover, a drying member comprising an inclosing shell, a series of resistance elements located therewithin, and insulated wires leading to connection with an external source of electricity for energizing said resistance elements, thereby heating said inclosing shell.

5. The combination, with a reciprocatory sheet carriage of a printing mechanism, means adapted to be encountered by the printed sheets as the carriage travels in the direction from which the printed sheets are fed, whereby each sheet is swept toward the opposite end of said carriage, and a heating member located near the last-mentioned end of the carriage, over which each sheet must travel as it is swept from its position on the carriage, said heating member comprising an inclosing shell and an included electrical heating element adapted to regulatably impart a drying influence on the freshly printed sheets passing over the outer surfaces of said inclosing shell.

6. In combination with means for causing the travel of printed sheets thereover, a heating member comprising a tubular casing, electrical conducting elements therewithin whereby the same may be heated, and insulating means separating said electrical conducting elements from the adjacent interior surface of the tubular casing.

In testimony whereof I sign this specification in the presence of two witnesses.

WILLIAM J. DANINGBURG.

Witnesses:
WILLIAM M. SWAN,
JEFFERSON G. THURBER.